Oct. 3, 1967

S. KOVACIK ET AL 3,344,968

TRIMMING GLASS SHEETS

Filed Dec. 2, 1965

INVENTORS
Stephen Kovacik and
Lester W. Cramer

Nobbe & Swope
ATTORNEYS

United States Patent Office 3,344,968
Patented Oct. 3, 1967

3,344,968
TRIMMING GLASS SHEETS
Stephen Kovacik, Rossford, and Lester W. Cramer, Toledo, Ohio, assignors to Libbey-Owens-Ford Glass Company, Toledo, Ohio, a corporation of Ohio
Filed Dec. 2, 1965, Ser. No. 511,096
8 Claims. (Cl. 225—2)

The present invention relates to glass cutting and more particularly to producing clean breaks in trimming margins from large thick glass sheets.

In cutting glass sheets of ordinary thickness up to one-quarter of an inch, it is customary to first score the glass along a line where the final cut is to be located and thereafter apply mechanical forces to flex the glass to produce a bend about a point directly below and on the opposite surface of blank to produce an area of tension at the score line on the surface of the sheet or plate having the score line. However, as the thickness of the glass increases, much more difficulty is encountered in obtaining a true and clean break along the scored lines of the glass sheets.

Recent trends in architecture have made increasing demands for larger and thicker glass sheets to be used in construction of commercial buildings. To provide uninterrupted views, all-glass fronts in various types of building have been installed. These all-glass fronts require glass sheets or plates of up to one inch in thickness and in areas ranging up to and beyond 8 feet by 26 feet that may weigh more than one ton. It has been found that conventional methods of cutting glass are just not feasible for trimming the edges from these large and thick glass sheets with the accuracy and sharpness of break necessary in building fronts for example.

Many methods have been proposed to run cuts in these thick glass plates. However, the prior art methods have proved unsatisfactory with the cut often failing to follow the predetermined scored line for any appreciable distance. In actual trials, it has been found, among other things, that the cut in many instances will run inwardly or outwardly of the desired predetermined line and that the break will flare along the surface spaced from the score line.

This is probably due to the fact that in most commercial annealing processes, assuming closely controlled temperatures in the annealing temperature range of the lehr, a plot of the stress pattern located transversely of the ribbon (regional stresses) may conform to a parabola with the axis of the parabola located equally spaced from the opposite edges of the ribbon. The zero line of stress will be along a line perpendicular to the axis of the parabola which will intersect the axis of the parabola at a point wherein the compressive forces (below the zero line) will be equal to tension forces (above the zero line). As can be readily appreciated, this regional stress pattern will produce an area of high compressive forces along the outer edges of the ribbon after it has cooled below the annealing temperature range.

The regional stress pattern along any given line running transversely of the ribbon depends upon many factors, such as the temperature and thickness variations along the line. Therefore this ideal parabolic curve may take various shapes because of small variations in one of the factors, such as temperature. As a result varying stress patterns will occur along a given length of ribbon which of course will vary the compressive forces along any longitudinal line adjacent the outer edge of the ribbon or blanks produced from the ribbon.

In the prior known methods of trimming the outer edges from relatively large thick sheets it is probable that the reason for the cut not following the predetermined scored line is because of these varying compressive forces along this line.

However, according to the present invention the compressive forces along the longitudinal edges of a sheet of glass, as well as the tensile forces in the middle portion, are greatly reduced before making a final cut along a predetermined line to provide more uniform compressive forces along the predetermined scored line resulting in greatly improved edges.

It is the primary object of this invention to provide a novel method of cutting a sheet of glass along the outer longitudinal edges which produces extremely accurate and clean cuts.

Another object of the invention is to provide a novel method of cutting or trimming the margins of a large, thick sheet of glass by redistributing the stress pattern within the sheet prior to producing a final cut.

A further object of the invention is to provide a method for trimming the edges along a predetermined scored line of a sheet of glass by removing a portion thereof along the outer edges outwardly of the predetermined line prior to making a final cut along the predetermined line, and thereafter applying heat along the scored line to produce a clean break.

Other objects and advantages of the invention will become more apparent during the course of the following description when read in connection with the accompanying drawings.

In the drawings, wherein like numerals are employed to designate like parts throughout the same:

Briefly stated, the invention contemplates producing consistently true and clean breaks along straight scored lines along the marginal edges of a large, thick sheet of glass by first removing small portions of the glass outwardly of the scored lines to thereby redistribute the regional stress pattern transversely in the sheet and thereafter running the final cut along the scored lines to produce a glass sheet of desired size.

Although the novel procedure for trimming the edges from a body of glass has a wide variety of uses, the invention has shown considerable promise in trimming the edges of large glass sheets of approximately 8 feet by 26 feet and therefore will be specifically described in that connection here.

The apparatus for performing the novel operation is illustratively shown in FIGS. 1 and 4 through 6 and includes a table 10 for receiving a glass sheet 11 to be cut to size by removing the longitudinal marginal edges 12 thereof. Positioning and movement of the blank is facilitated by the provision of fluid pressure, such as low-pressure air, to create a cushion against the undersurface of the glass blank. The air cushion also aids in the final cutting opeartion which will be explained in more detail hereinafter.

Figure 1:
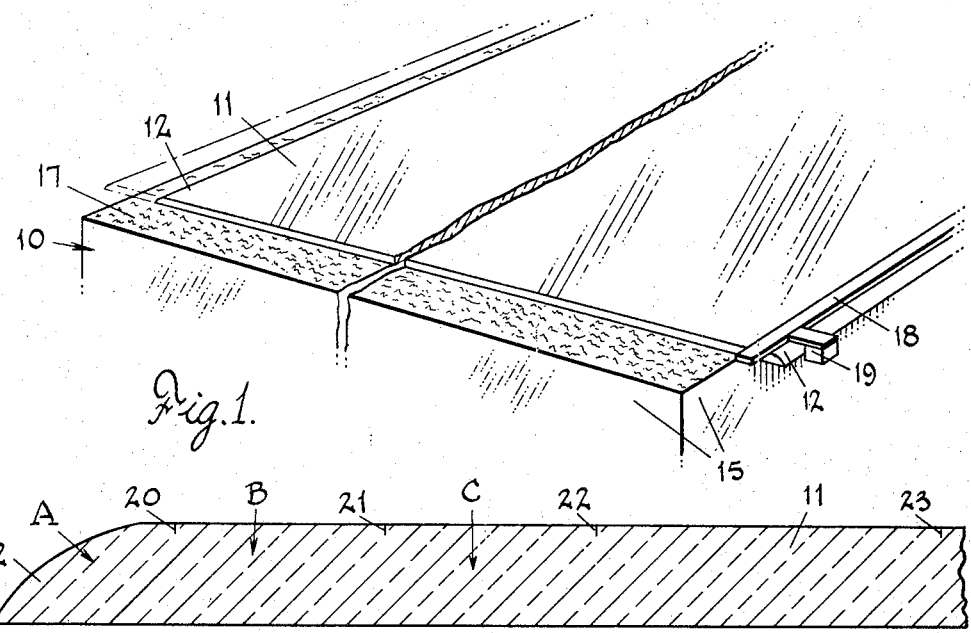
FIG. 1 is a perspective view of a glass cutting table having a glass sheet located thereon.
Figure 2:
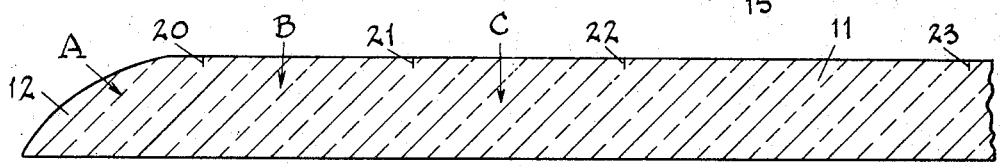
FIG. 2 is an enlarged transverse fragmentary sectional view of a glass sheet shown in FIG. 1.
Figure 3:
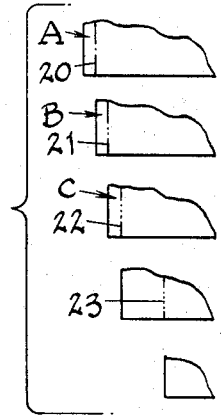
FIG. 3 is a fragmentary view of the various stages of the outer edge of the glass sheet as the edge is trimmed down to the line of final cut.
Figure 4:
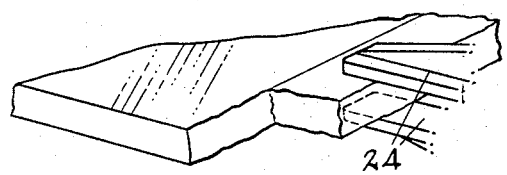
FIG. 4 is a fragmentary view of a glass blank showing one manner of removing portions of the outer edges of the glass.
Figure 5:
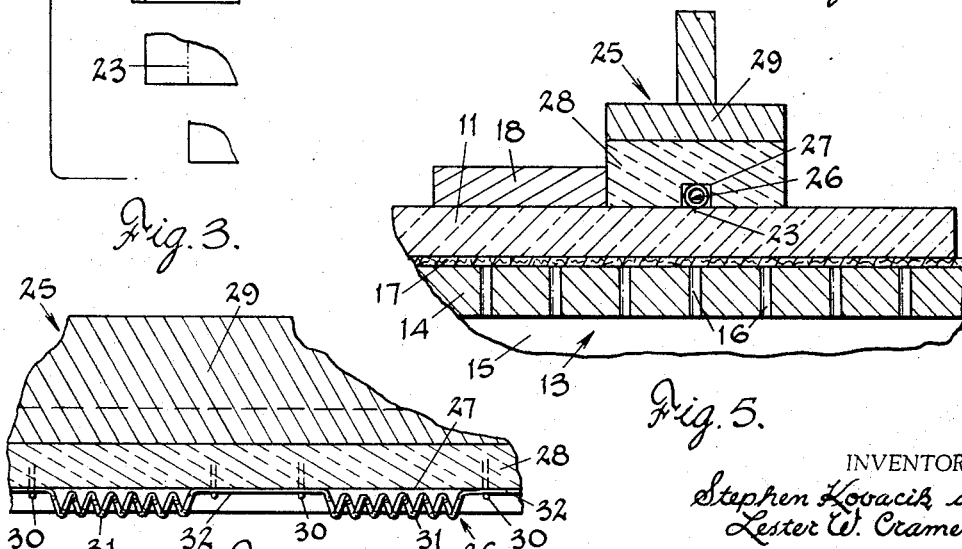
FIG. 5 is a fragmentary vertical sectional view of a glass cutting apparatus.

For this purpose and as viewed in FIGS. 1 and 5, the table 10 includes a plenum chamber 13 located below the top wall 14 and is formed by side walls 15 and a bottom wall (not shown). As shown in FIG. 5, the top wall or surface of the table is perforated by a plurality of holes 16 communicating with the chamber and is covered with a layer of suitable non-abrasive material 17, such as felt.

The glass sheet is placed on the surface of the table and is scored inwardly of the outer edge by means of a suitable cutting tool (not shown) which is guided by a gauging bar 18. The gauging bar may be properly located inwardly of the outer edge by a locating device 19.

In the illustrative embodiment of the invention, four score lines 20, 21, 22 and 23 are produced along each marginal edge of the sheet with the score line 23 being the predetermined line of cut. The glass section A located outwardly of the first score line is then removed by any suitable device. Although not limited to any particular apparatus, experience has shown that the removal or cutting of the small section is preferably done by nipping or breaking small portions of the outer edge of glass along the first score line 20 by means of a nipping tool or pliers 24. This procedure considerably increases the safety of the operation, since the area being removed is in a high degree of compression and any automatic cutting operation may cause the glass to explode when the cut begins to run which can result in injury to the operators of the apparatus.

The removal of the section A along each longitudinal edge of the blank reduces the regional compressive forces in the blank since this entire section is under regional compressive force. Therefore the regional tensile forces must also be reduced to again obtain a balance of forces in the remaining portion of the blank. This redistribution and reduction of the forces results in more uniform regional compressive forces along the outer edges of the glass blank since the compressive forces have been reduced. This necessarily follows since the gradient of compressive force per unit of width is at a maximum along the outer edges and decreases to zero somewhere inwardly of the outer edges. The sections B and C are thereafter removed in a similar manner to further reduce the compressive forces along the outer edges and produce a more uniform stress pattern along the line of final cut.

The final cut is run along the predetermined line or score line 23 by concentrating heat along the line to create alternate hot and relatively cooler areas in the glass along the score line to set up alternate tension and compression areas at the surface of the glass along the score line 23 sufficient to start a series of breaks from the scored surface of the blank at each of the tension areas along the score line.

Figure 6:
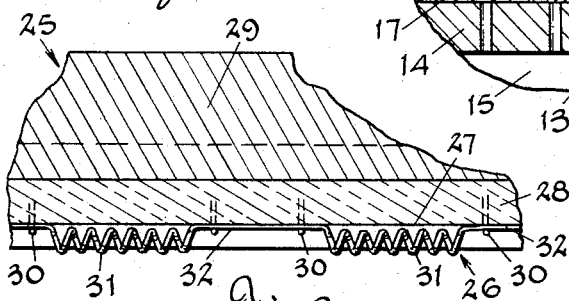
FIG. 6 is an enlarged fragmentary transverse sectional view of a portion of the glass cutting apparatus shown in FIG. 5.

To this end, as shown in FIGS. 5 and 6, an interval heating apparatus 25 for running the cuts along the predetermined lines comprises an electrical resistance element 26 mounted in an opening 27 located between the opposite edges of an insulating board or member 28 which may be formed of any material, such as Marinite. The insulating member is supported on a T-shaped support member 29 which may be formed of any suitable material. The support member provides a further function in that it may be utilized for easily handling the apparatus while being used.

The electrical resistance heating element is secured in the opening 27 by suitable securing means such as staples 30 and is made up of a plurality of coiled portions 31 interconnected by lengths of straight wire 32. The diameter of the coil is slightly larger than the depth of the opening 27 such that the lower portions of the coils extend beyond the surface of the insulating member for direct contact with a scored line on the surface of a glass blank to be cut. The opposite free ends (not shown) of the heating element may be connected to a source of electrical energy through a suitable voltage regulator so that the temperature of the element can be adjusted to meet various conditions. For a more detailed description of the construction and operation of the interval heating apparatus, reference should be made to Patent No. 2,584,851, issued to D. W. Dunipace, Feb. 5, 1952.

In use, the apparatus should be equal to or greater in length than the length of the glass blank in which the cut is to be made. However, for simplicity in maintenance and savings in cost, it is preferred to form the interval heating apparatus in a plurality of small interconnected sections (not shown) which may be suitably interconnected to form a continuous interval type heating apparatus.

The procedure set forth is illustrated quite clearly in the drawings wherein the glass sheet 11 to be trimmed is located on the surface of the table with the positioning being aided by the provision of fluid pressure. A plurality of spaced score lines 20 to 23 are made on one surface of the sheet inwardly of each longitudinal edge and thereafter the portions A, B and C are respectively or successively removed to redistribute the stresses within the glass sheet. The final cut is then made by locating the gauging bar a distance of one-half the width of the heating apparatus from the predetermined line of cut 23 and thereafter aligning the heating apparatus against one surface of the gauging bar to locate the electrical resistance element on the score line 23. Heat is supplied a sufficient period of time to allow the cut to run the entire length of the sheet. While the interval heating is supplied, fluid pressure is supplied through the perforated table surface to raise the blank a slight distance above the surface proper. Therefore, as the cut begins to run due to the interval heating along the score line, the running of the cut is aided by a bending action about a point directly below the score line due to the weight of the portion outwardly of the score line. The portion outwardly of the final cut may then be removed leaving an accurate and clean cut or final edge.

The novel method of trimming the longitudinal edges from glass sheets has been successfully used in removing edges of three-quarter inch plate glass having a blank size of 119 x 320 inches. In cutting or trimming the edges of a glass sheet of this size, the sheet was located or placed on the table surface and the score lines 20 to 23 formed on the upper surface inwardly of each of the outer edges. The score lines 23 indicating the predetermined lines of cut were placed ten inches from the outer edges of the blank with the remaining score lines 20, 21 and 22 being spaced 2, 4 and 6 inches, respectively, from the outer edges of the blank. The portions outwardly of each of the score lines were then successively removed with the nipping tool by moving the sheet on the table to have this portion overhanging the edge of the table with the movement being aided by the provision of low-pressure air through the table surface.

Thereafter the heating apparatus was aligned with the scored line of final cut and after a period of time, dependent upon various factors such as the type of glass, the voltage applied and the resistance of the wire, the sheet began to break at various points which were determined by the areas of tension set up by each of the coil sections of the heating apparatus. During this heating cycle the air being supplied to the surface of the table to more or less suspend the entire sheet a small distance from the table surface thereby allowing the outer edge to bend about a point directly below the predetermined line of cut to further aid in the breaking of the blank along the predetermined line.

As can be appreciated, the novel method set forth above is capable of producing edges on a glass body which are consistently clean and accurate and the procedure is readily capable of trimming edges on a mass production basis.

It is to be understood that the forms of the invention herewith described are to be taken as illustrative embodiments only of the same, and that various procedural changes may be resorted to without departing from the spirit of the invention.

What is claimed is:

1. A method of trimming the marginal edges from large, thick glass sheets having a regional stress pattern in which the longitudinal edge portions are in compression and the central portion in tension, which comprises scoring the sheet along a predetermined line, removing a portion of the sheet along a second line intermediate said predetermined line and the outer edge of said sheet to redistribute the regional stresses in said sheet, and running a final cut along said scored predetermined line by heat concentrated along said line.

2. A method as defined in claim 1, wherein said portion is removed by scoring along said second line and breaking off sections of said portion outwardly of said scored second line.

3. A method as defined in claim 1, wherein said portion is removed by successively breaking sections of said portion along a plurality of spaced lines intermediate the outer edge and said predetermined line.

4. A method as defined in claim 3, wherein a score is provided along each of said spaced lines and the sections are successively removed outwardly of each scored line.

5. A method of cutting a sheet of glass as defined in claim 1, wherein said sheet is supported on a perforated surface and fluid pressure is supplied through said surface while running the final cut to raise said sheet and produce mechanical bending forces adjacent said predetermined line.

6. A method as defined in claim 5, wherein said heat is applied at spaced intervals by electrical resistance elements creating alternate tension and compression areas at the surface of the glass along the score line sufficient to start a series of breaks from the scored surface of the sheet at said tension areas along the score line.

7. A method as defined in claim 1, wherein said sheet is scored along a pair of predetermined lines spaced inwardly of the respective longitudinal edges of the sheet, a portion is removed from each of said longitudinal edges outwardly of the predetermined lines, and a final cut is run along each of said predetermined lines by heat concentrated along said lines.

8. A method of cutting a sheet of glass as defined in claim 7, wherein the portions along each longitudinal edge are removed by scoring along said second line and breaking sections of said portion outwardly of each of said second lines.

References Cited

UNITED STATES PATENTS

| | | | |
|---|---|---|---|
| 1,720,883 | 7/1929 | Campbell | 225—93.5 |
| 2,948,991 | 8/1960 | Walters et al. | 225—96.5 |

WILLIAM W. DYER, JR., *Primary Examiner.*

JAMES M. MEISTER, *Assistant Examiner.*